United States Patent

Nakayana et al.

[15] 3,670,061
[45] June 13, 1972

[54] INTRODUCING NITROGEN GAS INTO THE MELT TO IMPROVE FUSED CAST REFRACTORIES

[72] Inventors: Junn Nakayana; Yukio Fukatsu, both of Tokyo, Japan

[73] Assignee: Asahi Glass Co., Ltd., Tokyo, Japan

[22] Filed: Oct. 29, 1970

[21] Appl. No.: 85,267

Related U.S. Application Data

[63] Continuation of Ser. No. 767,507, Oct. 14, 1968, abandoned.

[30] Foreign Application Priority Data

Nov. 7, 1967   Japan....................................42/71134

[52] U.S. Cl..........................................264/82, 13/34, 55/95, 106/55, 106/58, 106/59, 106/65, 264/332
[51] Int. Cl. ..........................................C04b 35/62
[58] Field of Search......................264/332, 82; 106/55, 95; 13/34; 55/95

[56] References Cited

UNITED STATES PATENTS

| | | | |
|---|---|---|---|
| 3,147,330 | 9/1964 | Gage........................................... | 13/34 |
| 3,373,240 | 3/1968 | Boeckler et al............................. | 13/34 |
| 3,484,511 | 12/1969 | Delrieux................................... | 264/332 |

Primary Examiner—Julius Frome
Assistant Examiner—John H. Miller
Attorney—Kurt Kelman

[57] ABSTRACT

In the production of a dense fused refractory, a dry gas is introduced into/onto a charge of refractory raw materials in a melting furnace. In particular, dry nitrogen gas is introduced through the bores of hollow electrodes used in an electric arc furnace. The resulting melt is poured into a mould where it is solidified or, alternatively, is allowed to cool in the furnace where it is solidified.

1 Claim, No Drawings

INTRODUCING NITROGEN GAS INTO THE MELT TO IMPROVE FUSED CAST REFRACTORIES

This application is a continuation of application Ser. No. 767,507 filed Oct. 14, 1968 and now abandoned.

BACKGROUND OF THE INVENTION

1. Field of the Invention

This invention relates to a method of producing refractories. More particularly, the invention relates to a method of producing a dense fused refractory by the melting and solidification of a refractory raw material or a mixture of raw refractory materials.

2. Description of the Prior Art

Melted and re-solidified refractories are currently in prevalent use because of their superior resistance to erosion and corrosion at high temperatures. The fused refractories are more resistant to erosion and corrosion, as well as to abrasion, as their textures gain in density, and those refractories with dense textures are serviceable under extraordinarily rugged conditions.

However, melted and re-solidified refractories in general have the disadvantage that they are disposed to be porous. Those refractories contain relatively large cavities known as blow holes as well as smaller gas holes which will hereinafter be referred to as micro-pores.

The blow holes occur as the cummulative result of the volume shrinkage of the casting and the difference in the rate of cooling between the casting surface and the core of the casting when the molten refractory material is poured in a mould.

In the conventional methods, it is impossible to prevent the formation of blow holes in the vicinity of the pouring gate of the mould. The portion of such a refractory which contains blow holes is usually trimmed off or, when a furnace is built, placed away from the interior surface of the furnace.

Micro-pores are ubiquitous, that is to say, not concentrated locally but distributed throughout the cast refractory, which increase its porosity.

To prevent such increases in porosity of fused refractories, attempts have been made to alter such operating conditions as melting temperature and casting temperature according to the composition of the charge.

For instance, low casting temperatures have been adopted for $Z_rO_2$—$Al_2O_3$—$SiO_2$ refractories and high casting temperatures for $Al_2O_3$ refractories.

Being effective under certain circumstances, those methods are not completely satisfactory. As alternatives thereto, use of various additives has been suggested and practiced. We previously developed such an alternative method which involves the use of metal (Japanese patent application No. 35688/1967).

SUMMARY OF THE INVENTION

After a series of researches into the aforementioned aspects of the problem, we have ultimately developed a method whereby fused refractories can be prevented from the increase in porosity due to the formation of micro-pores and, accordingly, the production of dense fused refractories is made possible.

This invention is therefore concerned with a method of producing a dense fused cast refractory which comprises sending a dry gas across or/and into a charge of refractory raw materials in a furnace in the course of melting or/and after the completion of melting and, particularly, a dry nitrogen ($N_2$) gas through the bores of the hollow electrodes used in an electric arc furnace.

It is a primary object of this invention to provide a dense fused refractory.

Another important object is to provide a fused cast refractory which has superior corrosion-erosion resistance against molten metal, molten slag, molten steel, molten glass and the like.

Another object of this invention is to provide a fused refractory which is particularly suited for the construction of steelmaking and glass-melting furnaces.

Other objects and advantages of this invention will become apparent as the following description of the invention proceeds.

DETAILED DESCRIPTION OF THE INVENTION AND DESCRIPTION OF PREFERRED EMBODIMENT

As is well known, a fused cast refractory is a refractory of the type which is usually produced by melting, in an electric arc furnace, a mixture of refractory raw materials and cooling the resulting melt until a solidified refractory is obtained. The aforementioned melt may be cast in a mould for solidification into the desired shape or, alternatively, may be allowed to cool in the melting furnace until it is solidified.

The method of this invention can be applied, with equal success, to both of the aforementioned methods. However, in light of the fact that it is more common to pour the melt into a mould, the following description of the invention will be made with particular reference to this method.

The fused cast refractory of this invention may have any desired composition. For example, $ZrO_2$—$Al_2O_3$—$SiO_2$, CaO—MgO, $Al_2O_3$, MgO—$Cr_2O_3$—$Al_2O_3$—(FeO), $Al_2O_3$—$SiO_2$, MgO—$Cr_2O_3$ and other refractories can be manufactured according to this invention. Among those refractories, however, refractories of the following compositions particularly gain benefit. (Throughout this specification, all percents are by weight).

| (1) | | (2) | | |
|---|---|---|---|---|
| $ZrO_2$ | 10–60% | CaO + MgO | >85% | |
| $Al_2O_3$ | 25–80% | Of the total, | MgO | 80–20% |
| $SiO_2$ | 5–20% | | CaO | 20–80% |
| | | $SiO_2$ | < 8% | |
| | | FeO ($Fe_2O_3$) | < 5% | |

In accordance with this invention, a mixture of refractory raw materials is molten in a furnace which is preferably an electric arc furnace. A dry gas is introduced, under positive pressure, across the charge or/and into the furnace. The dry gas may be admitted through the bores of the electrodes, throughout the entire melting process or may be introduced during only part of the melting period or after the completion of melting. Introduction of the dry gas may also be made through the bores of cylindrical refractory nozzles, which open onto the surface of the charge or which are submerged in the charge. Direct introduction of the gas into the charge is advantageous in that the melt is then brought into more intimate contact with the gas and a complete melting of the charge is assisted.

The hollow cylinder or cylinders to be employed for the introduction of said dry gas must be made of anti-corrosive refractory material and, generally, can be made of graphite. As an alternative, cylinders made of metal, e.g. copper, can be used along with water-cooling systems e.g., jacket.

An improved method has been developed for the introduction of such dry gas. In this method, the gas is directly introduced through the bores of the hollow electrodes used for the melting of the charge of the recractory materials. Thus, electrodes having longitudinal bores are used and the dry gas is introduced into the furnace through the bores. The hollow electrodes eliminate the need for other gas-admitting systems such as the hollow cylinders mentioned above.

The dry gas which is employed according to this invention may be nitrogen gas, argon gas, or carbon dioxide gas. Inert gases such as nitrogen and argon are particularly preferred. Thus, use of such an inert gas not only is conducive to the production of a dense casting, which is the object of this invention, but also to the protection of the hollow electrodes used for the introduction of the gas so that the consumption on the electrodes is considerably reduced. Oxidizing gases sometimes lead to an increased porosity of the cast refractory when they are introduced while the charge is still in a partially molten state. This happens presumably because the partially molten mass absorbs $O_2$ and releases the $O_2$ in the remainder of the melting process. This possibility is completely eliminated when an inert gas is employed.

The dry gas to be introduced according to this invention should be as free as possible from water vapor. Generally speaking, satisfactory results are obtained when the moisture content of the dry gas is less than 2.0 percent by weight, and particularly satisfactory results are obtained when said moisture content of the dry gas is less than 0.5 percent by weight.

While such dry gas is generally introduced at room temperature, it may sometimes be used after heating.

The amount or flow rate of said dry gas is determined based on the consideration of such factors as the effect attainable and the cost of gas. Introduction of an excess gas sometimes results in the occurrence of residual gas holes in the cast refractory and is also wasteful. The proper flow rate is about 2 to 120 liters per minute at atmospheric temperature and pressure when the amount of the charge is about 50 kg to 1,500 kg. Ordinarily, the gas is admitted evenly through a plurality of the hollow electrodes or hollow cylinders described above. It is understood that when the dry gas is introduced onto the surface of the charge instead of being directly bubbled into the charge, there might be only reduced effects due to the rapid diffusion or escape of the dry gas. Therefore, in such instances, the electric melting furnace is preferably provided with a refractory door which still partly escape the dry gas.

The results obtainable by this invention will now be considered. Although the detailed mechanism responsible for those beneficial results remains yet to be fully elucidated, the following possible causes may be cited.

Thus, the dry gas into the furnace assists in eliminating moisture such as the water vapor usually contained in the charge or the water vapor originating from the cooling water used for the cooling of the furnace.

In addition, such a dry gas, on introduction into the charge, is dissolved in the molten mass and tends to positively drive out other dissolved gases which would have been evolved in the course of solidification of the casting.

It is our presumption that one of the causes that bring about an increased porosity of the refractory due to the presence of micro-pores is the separation of the water vapor dissolved in the melt due to the difference in solubility as the melt is solidified.

Another possible cause appears to be the separation, upon solidification of the melt, of the atmospheric oxygen which has been dissolved in the charge during the melting.

In accordance with this invention, those causes of porosity are substantially eliminated.

This invention has the following additional advantages.

When a cast refractory is produced, the cracks that might be formed in the casting can be diminished by casting the material mixture at a high casting temperature. On the other hand, such a high casting (pouring) temperature often results in an increased porosity of the cast product. By way of example, we have often experienced, when cast refractories are produced by melting identical $ZrO_2$—$Al_2O_3$—$SiO_2$ mixtures at 1,830° and 1,860° C., respectively, that there is a difference of as much as 10 percent in bulk specific gravity between the two cast products.

However, by carrying this invention into practice, it is possible to produce a dense cast refractory even if refractory raw materials are molten at a high temperature and the melt is poured at high temperature.

The dry gas according to this invention tends to promote the removal of carbon from the melt. Therefore, the fused refractory attained according to this invention has a satisfactory appearance with little trace of reduction color. Furthermore, the cast refractory of $ZrO_2$—$Al_2O_3$—$SiO_2$ type, which is obtained according to this invention, exhibits only a low blistering potential when it is contacted with molten glass.

To assist in a better understanding of this invention, we shall hereinafter describe the method of this invention in further detail, together with the characteristics the fused refractory samples produced by the method of this invention.

EXAMPLE 1

An electric arc furnace is charged with 150 kg of the following refractory raw materials, and the charge of refractory materials is thoroughly melted at the maximum temperature of 2,000° C.

| | |
|---|---|
| Desiliconized zircon (80% $ZrO_2$, 5% $SiO_2$, 14% $Al_2O_3$, others 1%) | 10 parts |
| Zircon sand (66% $ZrO_2$, 33% $SiO_2$, others 1%) | 20 parts |
| Bayer process alumina (99% $Al_2O_3$, others 1%) | 30 parts |
| Refractory butt (35% $ZrO_2$, 12% $SiO_2$, 51% $Al_2O_3$, 2% $Na_2O$) | 40 parts |
| Soda ash | A small amount |

Two hollow electrodes, each measuring 150 mm in outer diameter, 6 mm in inside diameter and 1,800 mm in length, are used for the melting of the raw materials. The electrodes are submerged in the charge so that dry nitrogen gas may be bubbled into the charge. The moisture content, blowing period and flow rate of the nitrogen gas introduced through the bores of two electrodes are as follows.

| | |
|---|---|
| Water vapor (weight %) | 0.1 or less |
| Blowing period (min.) | 60 |
| Flow rate (l/min.) | 21 (at atmospheric temperature and pressure) (10.5 per electrode) |

The charge, which is completely molten, is poured in a mould at the pouring temperature of 1,920° C., and allowed to cool until it is solidified.

The cast refractory [$A_1$] produced according to this invention has the following properties. The control samples [$P_1$] and [$P_2$] are the cast refractories produced from the same materials as above by the conventional method which does not employ a dry gas. Pouring temperatures are 1,920° C. for [$P_1$] (which is the temperature used for [$A_1$]) and 1,830° C. for [$P_2$].

| | [$A_1$] | [$P_1$] | [$P_2$] |
|---|---|---|---|
| Appearance color | Pale yellow | Gray to brown | Light gray |
| Appearance cracks | Substantially absent | Substantially absent | Local cracks |
| Section | Very dense | Porous | Dense |
| Bulk specific gravity | 4.14 | 3.48 | 4.06 |
| True specific gravity | 4.21 | 4.23 | 4.16 |
| Corrosion-erosion resistance (Note 1) | 1.40 | 1.00 | 1.35 |
| Blister index (Note 2) | 1 | 4 | 5–6 |

(Note 1) The corrosion-erosion resistance is expressed and shown in relative values with the sample [$P_1$] being assumed to have a value of unity. The test procedure is described below (The higher the value, the higher is the corrosion-erosion resistance of the product).

A crucible is constructed of refractory samples cut from the cast product. In this test, 1200 g of soda ash glass (72.1% $SiO_2$, 1.3% $Al_2O_3$, 8.2% CaO, 3.5% MgO, 14.3% $Na_2O$, 0.3% $K_2O$ and 0.3% $SO_3$) is placed, in the crucible as a corroding agent, and the crucible is operated at 1600° C for 25 hours (3 r.p.m.). The crucible is collapsed to take out the samples, and the depths of corrosion-erosion are measured. From the results, the reciprocal ratios are calculated.

(Note 2) The blister indexes are calculated as follows. From each tested cast refractory, a disc measuring 22 mm in diameter and 2-3 mm in thickness is cut out. The disc is sandwitched between soda ash glass discs, 40 mm across and 5 mm thick each, and the whole unit is placed in a crucible of alumina, where it is heat-treated at 1100° C. for 1 hour. The blisters that have appeared on the cut refractory sample are counted. When the number of blisters less than 0.1 mm in diameter ranges from 0 to 50, the blister index of unity is assigned to the sample. The index is 2 when the number of blisters range from 51 to 100. Refractories having smaller index values are more satisfactory.

EXAMPLE 2

The procedure of Example 1 is duplicated, while altering the type of moisture content of dry gas, the blowing method and system, the flow rate and period are varied as shown in Table 1. The properties of the resulting refractories are shown in Table II, together with the rates of consumption of the electrodes.

TABLE I

| Sample | Type of gas | Moisture content (weight percent) | Means of gas blowing | Blowing method | Flow rate (l./min.) | Blowing time (min.) |
|---|---|---|---|---|---|---|
| $A_1$* | $N_2$ gas | Less than 0.1 | Hollow electrodes | Into substance of charge | 21 | 60 |
| $A_2$ | do | Less than 0.001 | do | do | 21 | 20 |
| $A_3$ | do | Less than 0.5 | do | do | 21 | 80 |
| $A_4$ | do | Less than 1.5 | Refractory nozzles | Onto surface of charge | 21 | 80 |
| $A_5$ | $CO_2$ gas | Less than 0.4 | do | Into substance of charge | 21 | 60 |
| $A_6$ | do | Less than 0.1 | do | Onto surface of charge | 90 | 80 |

*Same as Example 1.

TABLE II

| Sample | Appearance and section texture of cast refractory | (Note 3) Corrosion-erosion resistance | (Note 4) Consumption of electrodes |
|---|---|---|---|
| $A_1$ | Pale yellow, very dense | 1.45 | 0.7 |
| $A_2$ | do | 1.50 | 0.8 |
| $A_3$ | do | 1.45 | 0.7 |
| $A_4$ | White, pretty dense | 1.35 | 0.7 |
| $A_5$ | Pale yellow, pretty dense | 1.45 | 1.0 |
| $A_6$ | White-pale gray white, very dense | 1.30 | 1.0 |
| $A_7$ | Gray-brown, pretty dense | 1.20 | 1.1 |

NOTE 3.—The test procedure is the one described in Example 1 with relative values of [$P_1$] having a value of unity. The higher the value, the greater is the corrosion-erosion resistance of the product.
NOTE 4.—Relative values with the amount of consumption of electrodes in the production of Sample [$P_1$] of Example 1 being assumed to be unity are shown. The lower the value, the less is the consumption of electrodes.

EXAMPLE 3

200 kg of the following raw refractory materials are completely melted in an electric arc furnace at the temperature of 2500° C.

| | |
|---|---|
| Calcined dolomite (34.0% MgO, 65.1% CaO, 0.3% $SiO_2$, 0.6% others) | 50 parts |
| Magnesia clinker (98.3% MgO, 0.9% CaO, 0.4% $SiO_2$, 0.4% $Fe_2O_3 + Al_2O_3$) | 50 parts |

Two hollow electrodes, each measuring 150 mm in outer diameter, 6 mm in bore diameter and 1,800 mm in length, are used. Dry $N_2$ gas is introduced through the two electrodes into or onto the charge under various conditions. Those conditions are set forth in Table III. After the melting is complete, the molten material is poured in a mould, where it is allowed to cool and resolidify. The properties of the castings are shown in Table IV.

TABLE III

| Sample | Moisture content of $N_2$ gas (weight %) | Flow rate of $N_2$ gas (l/min) | Time of blowing | Blowing period (min) |
|---|---|---|---|---|
| $P_3$* | — | 0 | — | — |
| $B_1$ | Less than 0.005 | 5 | During melting | 50 |
| $B_2$ | Less than 0.5 | 30 | During melting | 30 |
| $B_3$ | Less than 0.1 | 45 | After melting | 8.0 |

*A control sample produced in the absence of dry gas.

TABLE IV

| Sample | Color | Texture of cross-section | Bulk specific gravity | True specific gravity | (Note 4) corrosion-erosion resistance (mm) |
|---|---|---|---|---|---|
| $P_3$ | Brown | Porous, bulging | 2.61 | 3.46 | 0.8 |
| $B_1$ | Brown | Dense | 3.22 | 3.44 | 2.4 |
| $B_2$ | Brown | Dense | 3.24 | 3.46 | 2.1 |
| $B_3$ | Brown | Pretty dense | 3.05 | 3.48 | 1.7 |

(Note 4) Corrosion-erosion resistance is measured as follows. A crucible constructed of various samples in combination is charged with converter slag (39% CaO, 45% FeO, 8% $SiO_2$, 4% MnO and 2% $P_2O_5$ + $V_2O_5$, which is a corroding agent, and this crucible is operated at 1700° C for 25 hours (3 r.p.m.). Then, the depths of corrosion-erosion of the samples as caused by the converter slag are measured and compared with the depth of corrosion-erosion of a control sample (fired MgO refractory comprising fused magnesia). The reciprocal ratios are calculated and shown as corrosion-erosion resistance. The higher the value, the greater is the corrosion-erosion resistance of the sample.

It will be apparent that all the refractories produced according to this invention are very useful as refractories in the respective fields of application.

We claim:
1. In a method of producing a dense, fused refractory having a composition selected from the group consisting of $ZrO_2$—$Al_2O_3$—$SiO_2$, CaO—MgO, $Al_2O_3$, MgO—$Cr_2O_3$—$Al_2O_3$—(FeO), $Al_2O_3$—$SiO_2$, MgO—$Cr_2O_3$, from a melted charge of raw material of said refractory in a furnace after which the formed melt is permitted to solidify, the improvement which comprises, introducing into said melt dry nitrogen gas containing less than 0.5 percent by weight of moisture and being free of oxygen gas, said introduction being effected from a hollow electrode at a flow rate of about 2 to 120 liters per minute at atmospheric temperature and pressure per about 50 to 1,500 kg. of melt, said dense, fused refractory having a corrosion-erosion resistance between 1.35 and 1.50, and a blister index of 1.

* * * * *

UNITED STATES PATENT OFFICE
CERTIFICATE OF CORRECTION

Patent No. 3,670,061    Dated June 13, 1972

Inventor(s) Junn Nakayama et al

It is certified that error appears in the above-identified patent and that said Letters Patent are hereby corrected as shown below:

Page 1, at "72", line 1, change "Nakayana" to --Nakayama--

Signed and sealed this 12th day of December 1972.

(SEAL)
Attest:

EDWARD M. FLETCHER, JR.
Attesting Officer

ROBERT GOTTSCHALK
Commissioner of Patents